United States Patent [19]

Rudan et al.

[11] Patent Number: 5,366,754
[45] Date of Patent: Nov. 22, 1994

[54] REDUCED FAT PEANUT BUTTER PRODUCT AND METHOD OF MAKING

[75] Inventors: Brenda J. Rudan, Ithaca, N.Y.; Marguerite L. Yang, Mundelein; Anthony M. Miller, Northbrook, both of Ill.; Stephen P. Lombardo, Grayslake; Russell K. Moroz, Mundelein, both of Ill.; Lynn B. Deffenbaugh, Grayslake; David W. Mehnert, Antioch, both of Ill.; John Peluso, Chicago; R. G. Krishnamurthy, Glenview, both of Ill.

[73] Assignee: Kraft General Foods, Inc., Oak Brook, Ill.

[21] Appl. No.: 80,313

[22] Filed: Jun. 22, 1993

[51] Int. Cl.$^5$ ................................. A23L 1/38
[52] U.S. Cl. ................... 426/633; 426/506; 426/507; 426/510; 426/511; 426/519; 426/520; 426/804
[58] Field of Search .............. 426/633, 804, 519, 520, 426/506, 507, 510, 511

[56] References Cited

U.S. PATENT DOCUMENTS

| | | | |
|---|---|---|---|
| 3,619,207 | 11/1971 | Dzurik | 99/128 |
| 3,689,287 | 9/1972 | Mitchell, Jr. | 99/126 |
| 3,800,056 | 3/1974 | Mitchell, Jr. | 426/457 |
| 3,903,311 | 9/1975 | Billerbeck et al. | 426/633 |
| 3,947,599 | 3/1976 | Mitchell, Jr. | 426/250 |
| 4,113,889 | 9/1978 | Baxley | 426/509 |
| 4,190,577 | 2/1980 | Steele et al. | 260/123.5 |
| 4,265,925 | 5/1981 | Campbell et al. | 426/641 |
| 4,329,375 | 5/1982 | Holloway, Jr. et al. | 426/632 |
| 4,466,987 | 8/1984 | Wilkins et al. | 426/632 |
| 4,667,015 | 5/1987 | May | 530/377 |
| 4,728,526 | 3/1988 | Avera | 426/633 |
| 4,814,195 | 3/1989 | Yokoyama et al. | 426/633 |
| 4,828,868 | 5/1989 | Lasdon et al. | 426/633 |
| 4,942,055 | 7/1990 | Avera | 426/633 |
| 5,034,242 | 7/1991 | Lasdon et al. | 426/633 |
| 5,240,734 | 8/1993 | Izzo et al. | 426/633 |
| 5,266,473 | 11/1993 | Nielsen | 426/44 |

FOREIGN PATENT DOCUMENTS

| | | |
|---|---|---|
| 1075262 | 4/1980 | Canada . |
| 1108925 | 9/1981 | Canada . |
| 381259 | 1/1990 | European Pat. Off. . |
| 2007961 | 3/1982 | United Kingdom . |

OTHER PUBLICATIONS

"Relation of the Heat Resistance of Salmonellae to the Water Activity of the Environment", Appl. Microbio. vol. 19, No. 3, pp. 429–433, 1970.

"Effect of Available Water on Thermal Resistance of Three Nonsporeforming Species of Bacteris", Appl. Microbio., vol. 14, No. 3, pp. 416–420, 1966.

*Primary Examiner*—Helen Pratt
*Attorney, Agent, or Firm*—Fitch, Even, Tabin & Flannery

[57] ABSTRACT

A low fat, high moisture peanut butter composition containing from 0 to 50% peanut flour having less than about 1% peanut oil and from 0 to about 50% of a fat containing peanut source selected from the group consisting of peanut paste from non-defatted peanuts having about 50% peanut oil and partially defatted peanut paste having from about 12% to about 30% peanut oil. The peanut flour and peanut paste are present in the composition at a level sufficient to provide from about 10% to about 24% of peanut protein. The composition also optionally includes from 0 to about 10% of a protein source selected from the group consisting of whey protein isolate, peanut protein isolate and whey protein concentrate. The peanut butter composition has from about 23% to about 40% moisture. The peanut butter composition also includes a humectant and emulsifier system comprising sorbitol, lecithin, glycerine, sodium stearoyl lactylate, xanthan gum and may optionally include polyphosphate. The humectant and emulsifier system is present at a level sufficient to provide a water activity (Aw) of less than about 0.91. The peanut butter composition has from about 1% to about 25% of vegetable oil, preferably peanut oil.

8 Claims, No Drawings

REDUCED FAT PEANUT BUTTER PRODUCT AND METHOD OF MAKING

FIELD OF THE INVENTION

The present invention is directed to a reduced fat peanut butter spread and a method for manufacture thereof. More particularly, the present invention is directed to producing a peanut butter spread having reduced fat, high protein and a high level of moisture which is shelf stable at ambient temperatures.

BACKGROUND OF THE INVENTION

Conventional peanut butter is prepared from shelled peanuts roasted at about 170° C. which are thereafter cooled to about 30° C. These roasted peanuts are then blanched, the skins and nibs are removed and the blanched kernels are split into halves. The blanched, split peanuts are then coarsely ground and to the coarsely ground nuts are added optional ingredients, such as sweetener, salt and hydrogenated vegetable oil. All of the ingredients are thoroughly mixed and are then finely ground. This mixture is then cooled and packed into jars.

Peanut butter is a highly nutritious food containing high levels of protein. However, peanut butter also contains relatively large quantities of fat. A typical peanut butter product will have an oil content of about 50%, a protein content of about 29% and a fiber content of 1 to 2%. Sugars, carbohydrates and moisture normally constitute the rest of the product. The moisture level is usually less than about 2%. Due to the low moisture level and the high level of oil, peanut butter is a highly stable product which can be kept unrefrigerated for substantial periods of time.

To be labeled "peanut butter" under the applicable regulations of the United States Food and Drug Administration, the peanut ingredients must comprise at least 90% of the weight of the finished product, 21 C.F.R. §164.150. If more than 10% of the peanut product consists of non-peanut ingredients, then the product may be termed a "peanut spread", 21 C.F.R. §102.23(a) so long as it meets all of the conditions set forth in 21 C.F.R. §102.23(b). One of these conditions is that the protein content of the product is at least 24% by weight of the finished product.

There has been a substantial amount of research directed to reducing the oil content and, thus, the calorie content of peanut butter. One of the most common methods for effectively decreasing the amount of calories per unit volume in food products is the addition of water as a non-calorie ingredient together with a thickener or emulsifier to duplicate the texture of the original product. However, the addition of water adversely affects the flavor, color, texture and mouthfeel of peanut butter products. More importantly, unlike peanut butter which is microbiologically stable at room temperature because of the high level of oil and the low level of water, generally about 1-2% by weight, peanut butter products having high levels of water must usually be refrigerated after opening even if the peanut butter products contain preservatives to retard spoilage.

Replacement of oil with bulking agents has been proposed. U.S. Pat. No. 4,814,195 to Yokoama, et al. is directed to a reduced calorie peanut butter product containing from about 15% to about 40% by weight of a solid bulking agent selected from polydextrose and microcrystalline cellulose.

U.S. Pat. No. 4,828,868 to Lasden, et al. is directed to a low calorie, low fat peanut butter-like product and a method for making the product. In the method, unroasted defatted or partially defatted peanut flour having no more than about 35% fat by weight is milled in the presence of water to a maximum particle size of about 150 microns. The mixture of water and peanut flour is then cooked at a temperature of between about 175° F. and the boiling point of the mixture of peanut flour and water. The moisture level of the finished product is high and it is indicated in the Lasden, et al. patent that the product requires refrigeration for extended shelf life. While the Lasden, et al. patent indicates that defatted peanut flours that have as little as 1% fat can be used, no specific examples are provided as to how to produce a peanut butter product having as low as 1% fat.

It would be highly desirable to provide a flexible method for preparation of lowered fat peanut butter products having from about 50% to less than 1% of the fat normally associated with peanut butter, i.e., a total fat content of from about 1% to about 25%.

Accordingly, it is a principal object of the present invention to provide a method for the manufacture of lowered fat, high moisture peanut butter products.

It is another object of the present invention to provide high moisture, lowered fat peanut butter products which are shelf stable without refrigeration.

SUMMARY OF THE INVENTION

The present invention is directed to a low fat, high moisture peanut butter composition containing from 0 to 50% peanut flour having less than about 1% peanut oil and from 0 to about 50% of a fat containing peanut source selected from the group consisting of peanut paste from non-defatted peanuts having about 50% peanut oil and partially defatted peanut paste having from about 12% to about 30% peanut oil. The peanut flour and peanut paste are present in the composition at a level sufficient to provide from about 10% to about 24% of peanut protein. The composition also optionally includes from 0 to about 10% of a protein source selected from the group consisting of whey protein isolate, peanut protein isolate and whey protein concentrate. The peanut butter composition has from about 23% to about 40% moisture. The peanut butter composition also includes a humectant and emulsifier system comprising sorbitol, lecithin, glycerine, sodium stearoyl lactylate, xanthan gum and may optionally include polyphosphate. The humectant and emulsifier system is present at a level sufficient to provide a water activity (Aw) of less than about 0.91. The peanut butter composition has from about 1% to about 25% of vegetable oil, preferably peanut oil.

In the method of the invention, a premix of the composition of the present invention is prepared in a jacketed high shear mixer. The oil containing components, such as partially defatted peanuts and lecithin are added after the remaining components have been blended. The premix is then subjected to a shearing step selected from the group consisting of steam injection and high pressure homogenization to reduce the particle size and provide the reduced fat, high moisture peanut butter spread. If not previously pasteurized by means of a steam injection shearing step, the peanut butter spread is then pasteurized, cooled and filled into suitable containers.

DETAILED DESCRIPTION OF THE INVENTION

Methods for extracting peanut oil from peanuts are well known. U.S. Pat. No. 3,947,599 to Mitchell, for instance, describes a method for making fully defatted or partially defatted flavorless shelf stable peanut flakes or flour by forming an aqueous mix of finely ground raw peanuts, drying the mix into a thin stratum and extracting the oil with a solvent, such as hexane. Peanuts may also be partially or fully defatted by extraction with supercritical carbon dioxide. It is also known to partially extract peanut oil from peanuts by use of hydraulic pressure, such as in a Carver hydraulic press or in a cocoa press. Such partially defatted peanut extracts generally contain from about 12% to about 30% peanut oil. As used herein, the term "peanut flour" means a fully defatted peanut material having less than 1% peanut oil. The term "peanut paste" means a partially defatted or non-defatted, ground, spreadable peanut material having from about 1% to about 50% of peanut oil.

The method of the present invention may be used to make a fully defatted peanut butter spread utilizing peanut flour containing less than about 1% peanut oil. The method may also be used to make a partially defatted peanut butter spread having from about 1% to about 25% peanut oil through use of peanut paste or a combination of peanut paste and peanut flour. Thus, the peanut butter spread composition of the present invention may have no peanut flour and may have no peanut paste in the composition; provided, however, that one or more of the peanut materials, selected from peanut flour and peanut paste is present in the composition at a level sufficient to provide from about 10% to about 24% peanut protein and less than 25% peanut oil in the composition. All percentages used herein are by weight and are based on the weight of the peanut spread composition, unless otherwise indicated.

It has been determined that if a fully defatted peanut butter spread is desired, that the peanut flour can be used at levels of up to about 36% before the viscosity of the resultant peanut spread product becomes too great. This corresponds to a protein level of about 20%. The United States Federal Standards of Identity for marketing a product as a peanut spread requires that the product have at least 24% protein. Accordingly, in order to meet the United States Federal Standards of Identity required for marketing the product as a peanut spread, additional protein is added to the composition. In general, a protein material selected from the group consisting of whey protein isolate, peanut protein isolate and whey protein concentrate is combined with the peanut flour at a level of from about 2 to about 10% to provide a peanut spread product with a desired level of total protein. The use of added protein source is not required when a partially defatted peanut spread product is prepared. Thus, the added protein source can be present in the compositions of the present invention at a level of from 0 to about 10%.

The peanut flour can be used at higher levels of up to about 50% if the peanut flour is subjected to proteolysis by use of a protease, such as alkaline protease. Proteolysis of the peanut flour is effected by forming an aqueous slurry containing from about 36% to about 50% peanut flour, adding from about 0.02% to about 0.2% of protease and fermenting the slurry for a period of from about 10 to about 60 minutes at a temperature of from about 90° to about 120° F.

The peanut spread products of the present invention have a moisture level of from about 23% to about 40%. At these levels of moisture, refrigeration is usually required for prior art peanut butter spreads to prevent bacterial growth under ambient temperature storage conditions. In accordance with the present invention, however, ambient shelf stability is attained by initial pasteurization of the peanut butter spread composition. Ambient shelf life of the peanut butter spread is attained by reducing the water activity of the peanut butter spread to less than about 0.91. Peanut butter produced from whole natural peanuts has a water activity (Aw) of less than about 0.4. It has been determined that the Aw of the reduced fat peanut butter spreads having a high level of moisture of the invention can be reduced to the 0.91 level through the use of humectants and emulsifying agents. The humectant or emulsifier of the present invention is selected from the group consisting of sorbitol, lecithin, glycerine, sodium stearoyl lactylate, xanthan gum and polyphosphate. At higher levels of peanut oil of from about 12% to about 25%, the Aw can easily be reduced through use of either sorbitol at a level of from about 5% to about 10% or xanthan gum at a level of from about 0.03% to about 0.6%. At lower levels of peanut oil, a humectant and emulsifier system is used wherein glycerine is present at a level of from about 0.5 to about 2.0%, lecithin is present at a level of from about 0.05 to about 0.3%, polyphosphate is present at a level of from 0% to about 0.4%, sodium stearoyl lactylate is present at a level of from about 0.05 to about 0.4%, sorbitol is present at a level of from about 0% to about 10.0% and xanthan gum is present at a level of from about 0.03% to about 0.6%.

The high moisture, reduced fat peanut butter spreads of the invention also contain antimicrobial agents, such as sorbic acid and calcium propionate. The antimicrobial agent is present at a level of from about 0.4 to about 0.8%. Preferably, a mixture of calcium propionate and sorbic acid is utilized with both components present at the same level.

Bulking agents, such as low DE corn syrup having a DE of from about 22 to about 36 and polydextrose, may be used in the high moisture, low fat peanut butter spreads of the invention at a level of from 0% to about 7%.

Sweetening agents, such as sucrose, brown sugar and honey are also present in the high moisture, reduced fat peanut butter spreads of the invention. The total amount of sugar used is from about 1% to about 10% of light brown sugar. The use of brown sugar is preferred for added flavor. Salt is also present at a level of from about 1% to about 2%. Additional optional ingredients include colorants and flavorants.

In preparing the high moisture, reduced fat peanut butter spreads of the invention, all of the ingredients, except the oil containing components, i.e., the peanut paste and lecithin, are added to a jacketed high shear mixer, such as a Stephan or Breddo mixer. The mixer is operated briefly under low shear conditions to combine the non-fat containing components. A period of time of from about 15 seconds to a minute is sufficient. The mixture is then subjected to high shear mixing to blend the ingredients and promote hydration for a period of from about 1 to about 25 minutes as the mixture is heated to a temperature of from about 120° F. to about 130° F. Thereafter, any oil containing ingredients, such as peanut paste, lecithin and flavors are added to the mixer and the mixer is operated at low shear for a period of about 1 minute to combine the components and provide a premix. The mixture is then deaerated and subjected to a shearing treatment selected from the group consisting of steam injection and high pressure homogenization.

For the high pressure homogenization shearing step, the premix at a temperature of about 125° F. is pumped through a high pressure homogenizer, such as a Rannie homogenizer, operated at a pressure of from about 5,000 to about 15,000 psig to provide a peanut butter spread. The exit temperature from the homogenizer is from about 150° to about 160° F. The peanut butter spread is then pasteurized at a temperature of from about 160° F. to about 180° F. for a period of from about 50 seconds to about 10 minutes. The peanut butter spread is maintained under low shear mixing conditions during the pasteurization/heat treatment. The pasteurization is preferably effected without use of vacuum to prevent loss of moisture from the product. The peanut butter spread is then cooled to a temperature of about 100° F. while subjected to low shear mixing and is packaged into suitable containers at that temperature. The containers are then placed into a 45° F. refrigerated cooler until distributed.

For the steam injection shearing step, the premix is pumped through a conduit provided with a steam injection nozzle. Steam is injected into the premix at a rate sufficient to increase the temperature of the premix to within the range of from about 160° F. to about 180° F. The steam injection into the premix creates a highly turbulent zone in the conduit and shears the premix sufficiently to provide a smooth peanut butter spread free of graininess. The peanut butter spread is then cooled, packaged and stored as previously described.

The following examples further illustrate various features of the invention, but are not intended to in any way limit the scope of the invention as set forth in the appended claims.

EXAMPLE 1

The following formulations of Table 1 were prepared to provide high moisture, reduced fat peanut butter spread compositions having from less than 1% to about 25% fat.

For each formulation, the ingredients which do not contain fat were added to a jacketed Stephan mixer. The non-fat ingredients were mixed at 500 rpm for 30 seconds. The mixture was then subjected to high shear mixing for 5 minutes as the mixture was heated to 125° F. Any oil containing ingredients were then added and the mixture was subjected to low shear mixing at 500 rpm for 30 seconds to provide a premix. The premix was then deaerated and subjected to a steam injection shearing step.

The steam injection shearing step is accomplished by injecting steam into a flowing stream of the premix after the addition and mixing of the oil containing ingredients to the premix. Steam is injected at a level sufficient to increase the temperature of the premix from the mixing temperature of about 125° F. to a temperature of from about 160° F. to about 180° F. for a period of from about 50 seconds to about 10 minutes. The steam injection step performs the dual function of shearing and pasteurizing the premix. After steam injection, the peanut butter spread is cooled and packaged as previously described.

TABLE 1

| Ingredient | Fully Fat Reduced | 83% Fat Reduced | 70% Fat Reduced | 62% Fat Reduced | 50% Fat Reduced |
|---|---|---|---|---|---|
| Water | 27.024 | 30.249 | 25.482 | 24.998 | 31.863 |
| Solvent extracted peanut flour | 41.420 | — | — | 15.000 | — |
| Cocoa pressed peanut flour (15% oil) | — | 36.400 | — | — | — |
| Hydraulic pressed peanut flour (24% oil) | — | — | 32.000 | — | 11.439 |
| Full fat peanut paste (50% oil) | — | 7.280 | 11.000 | 35.000 | 40.000 |
| Sorbitol | — | 9.360 | 7.000 | 6.000 | — |
| Peanut protein isolate | 9.265 | — | — | — | — |
| Whey protein isolate | — | 5.928 | 9.500 | 9.742 | 9.200 |
| Brown/Powdered sugar | 8.720 | 6.240 | 6.000 | 3.700 | 2.024 |
| Honey | — | — | 3.000 | 3.000 | — |
| Corn syrup solids (24 DE) | 6.651 | — | 2.770 | — | 2.024 |
| Salt | 1.635 | 1.872 | 1.500 | 1.100 | 1.500 |
| Glycerine | 1.635 | 1.040 | — | — | — |
| Sorbic acid | 0.327 | 0.312 | 0.300 | 0.200 | 0.300 |
| Calcium propionate | 0.327 | 0.312 | 0.300 | 0.200 | 0.300 |
| Polyphosphate | 0.327 | 0.312 | — | — | — |
| Sodium stearoyl lactylate | 0.218 | 0.208 | 0.200 | — | — |
| Lecithin | 0.218 | 0.208 | 0.200 | — | — |
| Xanthan gum | 0.545 | 0.052 | 0.050 | — | 0.050 |
| Color | 0.064 | 0.277 | 0.098 | 0.600 | — |
| Flavor | 1.526 | — | 0.600 | 0.600 | — |
| Protease | 0.098 | — | — | — | — |
| Calcium Chloride | — | — | — | 0.400 | — |
| Monoglyceride | — | — | — | — | 1.300 |
| TOTAL | 100% | 100% | 100% | 100% | 100% |

EXAMPLE 2

Additional formulations were prepared having the compositions set forth in Table 1. The premix was prepared as described in Example 1. The premix was then pumped through a Rannie 1251 high pressure homogenizer at a pressure of from about 10,000 psig to provide a peanut butter spread. The outlet temperature was 155° F.

What is claimed is:

1. A high moisture, reduced fat peanut butter composition comprising from 0 to 50% peanut flour having less than 1% peanut oil, from 0 to 50% of a fat containing peanut paste having from about 50% peanut oil, to about 1% peanut oil, from 0 to 10% of a protein source selected from the group consisting of whey protein isolate, peanut protein isolate and whey protein concentrate, from 23% to about 40% moisture, and a humectant and an emulsifier system having sorbitol at a level of from 0 to about 2.0% , lecithin at a level of from about 0.05% to about 0.3%, glycerine at a level of from about 0.5% to about 2.0%, sodium stearoyl lactylate at a level of from about 0.05% to about 0.4%, xanthan gum at a level of from about 0.03% to about 0 6% and polyphosphate at a level of from 0 to about 0.4%, said peanut butter composition having an Aw of less than about 0.91, having from less than about 1% to about 25% peanut oil and having from about 10% to about 24% of peanut protein.

2. A composition in accordance with claim 1 which contains peanut flour which has been treated with a protease.

3. A composition in accordance with claim 1 which also contains low DE corn syrup solids.

4. A composition in accordance with claim 1 which also contains sugar.

5. A method for making a high moisture, reduced fat peanut butter comprising:

(a) providing a premix comprising from 0 to 50% peanut flour having less than about 1% peanut oil, 0 to 50% of a fat containing peanut paste having from about 1% to about 50% peanut oil, from 0 to 10% of a protein source selected from the group consisting of whey protein isolate, peanut protein isolate and whey protein concentrate, from about 23% to about 40% water, and an emulsifier system having sorbitol at a level of from 0 to about 2.0%, lecithin at a level of from about 0.05% to about 0.3%, glycerine at a level of from about 0.5% to about 2.0%, sodium stearoyl lactylate at a level of from about 0.05% to about 0.4%, xanthan gum at a level of from about 0.03% to about 0.6% and polyphophate at a level of from 0 to about 0.4%, said premix having from less than about 1% to about 25% peanut oil and having from about 10% to about 24% of peanut protein, said premix being prepared by first forming a mixture of all non-peanut oil containing components and thereafter blending any peanut oil containing components with said mixture, and (b) subjecting said premix to shearing treatment selected from the group consisting of steam injection and high pressure homogenization to provide a high moisture reduced fat peanut butter spread.

6. A method in accordance with claim 5 wherein said premix is subjected to steam injection at a level sufficient to increase the temperature of said premix to from about 160° F. to about 180° F.

7. A method in accordance with claim 5 wherein said premix is subjected to high pressure homogenization at a pressure of from about 5,000 to about 15,000 psig.

8. A method in accordance with claim 5 wherein said premix includes a humectant and emulsifier system selected from the group consisting of sorbitol, lecithin, glycerine, sodium stearoyl lactylate, xanthan gum and polyphosphate.

* * * * *